Patented Feb. 15, 1938

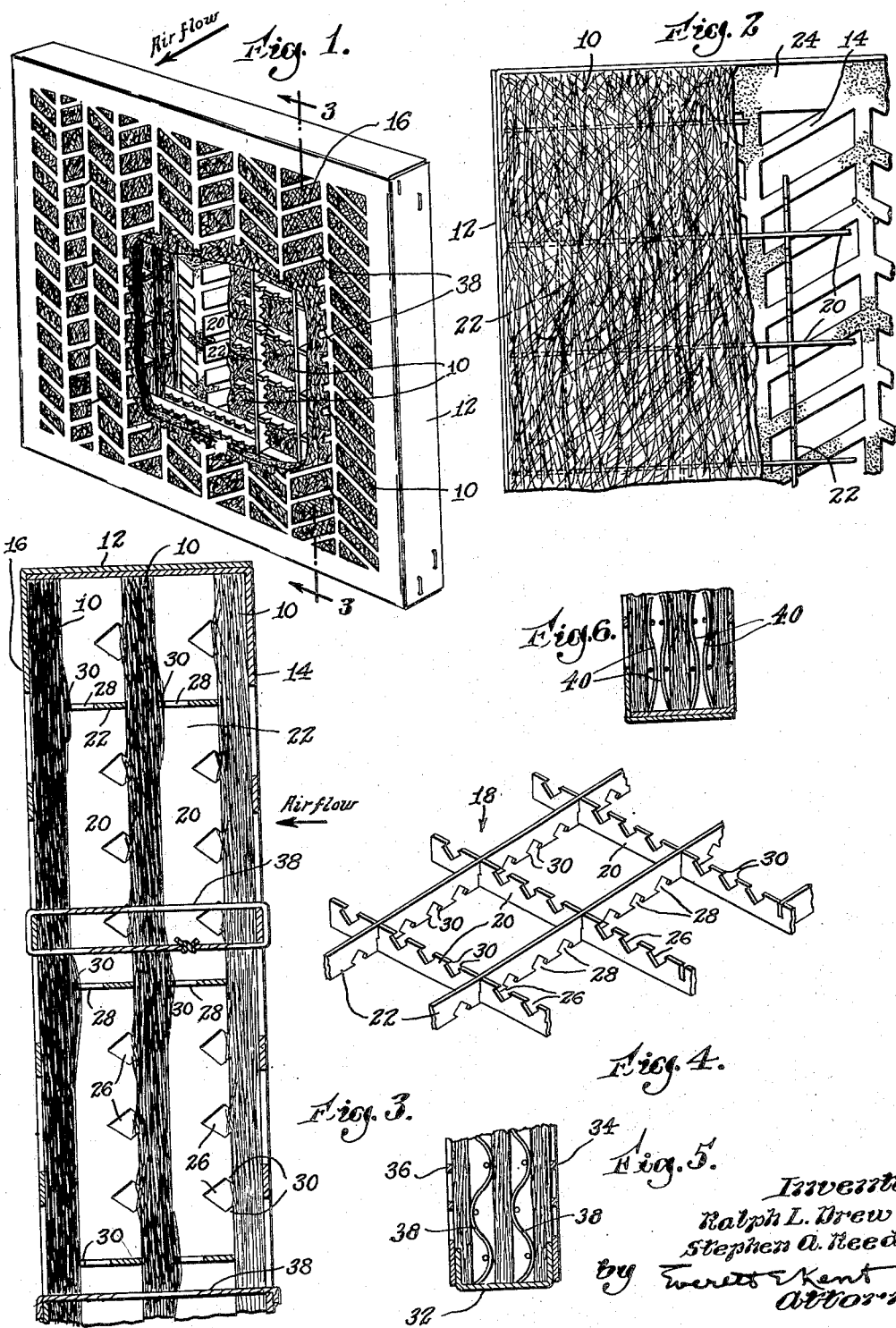

2,108,283

UNITED STATES PATENT OFFICE 2,108,283

AIR CONDITIONING DEVICE

Ralph L. Drew, North Plymouth, and Stephen A. Reed, Duxbury, Mass., assignors to Plymouth Cordage Company, North Plymouth, Mass., a corporation of Massachusetts Application May 18, 1935, Serial No. 22,206

10 Claims. (Cl. 183—49)

This invention relates to improvements in air conditioning devices.

More especially it relates to air filtering units, and particularly to the type wherein material of fibrous nature constitutes the filtering medium.

The invention provides improvements whereby a fibrous medium may be sustained and maintained with approximate uniformity of distribution and filtering effect at all points across the full area of cross-section through which the air is flowing; and wherein the combination of relatively thin sheets of the filtering medium with material providing intervening spaces produces important advantages as regards uniformity of filtering results, and as regards efficiency over longer periods of use, as compared with prior art devices of the same general sort.

It has been heretofore proposed to arrange loosely matted material of fibrous nature in the flow path of air, thus to arrest floating substances, for the air to pass on in a more wholesome condition. Various materials have been proposed for such a filtering medium, such as steel wool, spun glass, hair, and other filaments. But problems remain unsolved, because the fibrous material shifts its position and becomes compacted, and because the air passages through the filtering mass become filled at their surface entrances, after a relatively short period of use, so as to interfere with the desired flow of air, and to affect the uniformity and the efficacy and the efficiency of filtering. Vibration causes a sagging and edgewise compacting, which blocks some parts of the filter, and opens others where air can pass freely without being filtered.

One object of the invention is to make filtering units which can be more durably effective and efficient.

In addition to this, the invention provides improvement in the action, in that it provides for changing the pace of air along its course through the filtering unit, and thereby removes an increased percentage of its floating matter. It does this with a reduced body of filtering material.

Also it provides dust collecting air chambers within the unit.

It is a further feature to do these things with inexpensive, single service holding appliances, each having the double merit that it requires only a fractional filling of the filtering medium for a full charge; and that it may be discarded with the said medium after its period of useful service. If preferred, the holder may be of a permanent type, refillable. The medium itself may be hard vegetable fibre, which has the advantages of low inertia, low cost, efficiency, and, after use, of disposability by combustion.

The invention provides these and other advantageous results by employing in each unit a plurality of relatively thin layers of loosely associated fibre or other filamentary material, and by combining them with spacing elements which hold those layers apart and so make spaces between the layers, across which the air flows with less velocity than through the fine passages among fibres. Some of the suspended dust is thus allowed to settle, and so becomes removed by being deposited in the intervening free areas, instead of all of it having to cling to the fibrous material, in whose passages it has clogging effect.

The fibre layers thus spaced apart may be arranged in a holder adapted to be set across an air-flow passage as a filtering unit. The holder may have a channelled frame, as a retainer for the edges of the associated fibre layers, and have openwork front and rear faces, in the nature of grills.

The desired initial looseness of mutual association of the fibres may be attained, and may be maintained through the life of the filtering unit, by spraying an adhesive liquid on the interior surfaces of the box-like holder, and also on the separators if desired, by means of which the fibrous layers become effectively secured in proper relation to the holder, and resist the tendency to be compacted by the air flow.

In a preferred form of the invention provision is made for the impaling of the fibrous layers on the separators; and this may be either instead of or in addition to the said adhesion. This impaling when distributed over the whole cross-section of air flow, in a filter frame standing on edge, prevents sagging of the filtering medium toward one side of the air passage, as a result of vibration or for other reasons. The permanent success of these measures is promoted by combining therewith a fibrous material having a low specific gravity, of which the long and hard vegetable fibres such as sisal, java and manila are examples, as the filaments of material such as this are long and firm enough to span the supports and have negligible inertia and momentum, attributes which coact favorably toward the attaining of permanence of structure in the presence of incessant vibration.

It is intended that the patent shall cover, by suitable expression in the appended claims, whatever features of patentable novelty exist in the invention disclosed.

However, the scope is not limited to the specific devices which are selected for portrayal as illustrative embodiments.

In the accompanying drawing:

Figure 1 is an isometric view of a filtering unit embodying features of the invention, with the front face indicated only in part, and with a portion of the unit broken away to cross sections parallel with the face at successive stages of distance therefrom;

Figure 2 is an elevation, on a larger scale, of a corner fragment, with the outer portion of the box holder removed;

Figure 3 is an elevation, on a larger scale, in section on 3—3 of Figure 1;

Figure 4 is an isometric view of a fragment of one of the separator elements;

Figure 5 is an elevation, in section, of a fragment of a filter unit with a modified form of casing or holder, and with a different way of embodying the spacing device between fibre pads; and Figure 6 shows similarly another embodiment of spacing device.

The drawing portrays a filtering unit of a type suitable for use under a variety of conditions and in various locations where filtration of air may be desirable. It is especially suited for use in Pullman and other railroad cars, where dust and soot are prevalent, and where the efficiency and durability of filtering units heretofore have suffered from the almost continuous vibration to which they are subject.

According to the invention the filter has a plurality of layers 10 of fibre, set normal to the direction of air flow through the unit, and spaced apart within the unit. Each layer 10 constitutes a solids-screening section organized as a sheet-form mass. Any usual or suitable fibre or fibre-like material may be employed as the filtering medium, but hard vegetable fibre combines well for the purposes in hand, each layer being arranged in several veils of the fibre, deposited loosely, one upon the other, to the desired thickness. Three such layers 10 are represented in Figure 3, mounted in a chamber-casing 12 which may be of metal or cardboard, and whose front and rear faces are foraminous, being of openwork grid construction as seen at 14, 16. Separators 18, which also may be of metal or cardboard, set edgewise in the air flow, are positioned between adjoining layers 10 of fibre, maintaining the layers equally spaced apart. Each separator 18 constitutes a thick grid, being preferably a series of parallel elements 20 crossed in the same zone by a series of parallel elements 22 and interlocked therewith or otherwise secured thereto. The space comprised in the zone of thickness of the grid, intervening between adjoining layers 10 of fibre, constitutes a sheet-form solids-settling section which by said grid, is blocked into a multiplicity of rectangular areas, being contiguous sub-chambers, each of which constitutes a small dust collecting chamber. The multiplying of these across the airflow area makes it so that a particle of dust, even though it be floating at the axis or at the very top of the air stream, can be caught,—for upon settling but a short distance it reaches a floor where it can rest. The said crossed elements of the separators provide struts, distributed over the whole area across the airflow, for maintaining the fibre against serious displacement from its initial uniform distribution across the air flow. The relatively thin dimension of individual layers tends to minimize the compacting of the fibre. In the case illustrated the unit represented may be considered to be two inches thick, one-half of which is two half-inch spaces, so that each fibre pad illustrated would be only about one-third of an inch in thickness. The open space,—acting as a honeycomb of dust-catching chambers,—constitutes a device for reducing the quantity of fibre which would be required to fill it, if the fibre mass were continuous from face to face of the unit as customary heretofore, without to a proportionate extent reducing the efficacy. The air flow through any one of these chambers has a relatively large cross-section as compared with the net area open to air flow through a mass of fibre of area equal to the area of that chamber. And the flow is relatively quieter than in the repeated and quick bafflings of air passing through a fibrous layer 10. The chamber space therefore provides a change of pace of the air, which results in some dust being left therein. Other floating or driven matter is arrested among the fibres of the layers 10.

The making of the filter so that, when it is in service, its effectiveness and its efficiency, for filtering, will be maintained throughout the full cross sectional area of the unit are two important attributes of the invention. This is particularly important in installations subject to vibration or shock; and it is attained by either or all of three devices: impaling means for the fibre; stiffening means therefor; and adhering means therefor.

Any reasonably sharp elements or projections on the separators 18 will be sufficient for the impaling means. The means portrayed is a multiple notching of the crossing elements, as at 26, 28, with tongues for impaling the fibre at the entrance to each notch. Also we apply an adhesive substance 24 (Figure 2) to the interior surfaces of the case 12, and to the edges of the cardboard 10 in the separators 18, in order that the fibre may be held on the casing and separators by adhesion at short distances apart. And these may be supplemented by the coating or spraying of the fibre with a stiffening substance. Each of these means tends to maintain fibres and small groups of fibres against dislocation toward or from either edge of the filter unit. The flow and velocity of air through the unit makes a continuous pressure of substantial aggregate; and these devices save the individual layers 10 from becoming seriously compacted. The surface, or all layers, may be treated with a fire-resisting compound, thus rendering the whole fire resisting. As examples of the practice of the invention in utilizing filamentary material for the purposes stated, and especially for utilizing hard vegetable fibre, but not as limitations to the particular materials named, the said adhesion may be effected in a waterproof manner by applying casein glue; the stiffening by the use of starch, glue or a combination of the two, or shellac; and the fire-resisting by sodium silicate. Each of these may be applied by spraying it upon the fibre or the grid or encasing surface which is to be treated.

The efficiency and effectiveness of the unit may be made to continue longer in service by constructing the filtering layers 10 with gradation of density. Assuming air to be flowing with the arrow in Figure 3, the first encountered filtering layer 10 may be organized with larger spaces between its fibres than the mid-layer 10, offering less resistance to air flow and the mid-layer 10 less than the third filtering layer 10. In this way, the first layer 10 may permit the passing of some of the medium-fine and fine particles in the air, and they may be caught in a later layer. Clogging of the entrance spaces by a building up of deposits of fine material is thus delayed, and that fine material is distributed throughout the unit. But the first layer 10 predominantly stops relatively coarse foreign substances; the mid-layer 10 intercepts some of the finer foreign matter; and the third layer 10 is so dense as effectively to filter out the finest particles which may have continued in the air to this stage. The efficiency is increased in this respect by spraying the fibre with a heated liquid or a solution which cools or evaporates so as to leave a tacky dust-catching surface. This may at choice be applied in varying degrees of tackiness. An illustration of such, applied when heated, is petroleum jelly.

In Figure 3, this gradation of filtering effect is portrayed by variation in the density of the respective layers 10. This can be accomplished with precision by building up the filter pads of hard fibre carded into thin veils, several veils being put together to make a single pad. By varying the number assembled for a pad, but ultimately compressing the assembly to the dimension of thickness predetermined for the pads, variations of size of air passages result.

If desired, successive veils may have their fibres predominantly crossing each other, thereby to produce a criss-cross arrangement of fibres in the ultimate pad, which tends toward a greater uniformity of filtering effect than when the fibres are predominantly in approximate parallelism.

If the casing or box 12 is an inexpensive cardboard or metal container as represented in Figures 1-3, it may be discarded with the filter material after the latter has become covered or choked. If a refillable container be employed, it may take the form of a channel frame 32 as indicated in Figure 5, the front and rear grids 34, 36, being of metal or any other suitable material. In either case, as represented, the parts may be secured together in any desired way, the ties 38 being one way that is both practicable and convenient.

The grid illustrated in Figure 1 can be recognized as one variety of any coarse filling, maintaining space between adjacent filter pads. This spacing-filling is not necessarily symmetrically organized; and there is observable advantage even when the grid construction which provides multilevels of chamber-floors is omitted. The spacing material may be any sufficiently stiff aggregate of filamentary form; and Figure 5 illustrates an embodiment of the spacing device which is a sheet of coarse-meshed fine wire 38 or screening of any inexpensive type, as chicken wire, folded into corrugations which reach across the space between adjacent pads. The crests of the corrugations constitute supports for the fibres in the pads, and may engage them at frequent intervals both by impaling points (not shown, but which may be provided by cutting and bending out wires) or by pressure of the wires, and by adhesion of a glue. Similarly the support may be such a meshed wire 40 arranged in a plane on the face of a fibre pad, as in Figure 6.

We claim as our invention:

1. An air filtering unit comprising a container having openwork front and rear faces; filtering contents therefor comprising a flat mat of loosely associated hard vegetable fibres; and an interior grid, crossing the container beside a face of the mat, and pressing against the fibres at said face, having thin strips of substantial breadth set edgewise in the direction of air flow, crossing each other and halved together.

2. An air filtering unit comprising a container having openwork front and rear faces; filtering contents therefor comprising a flat mat of loosely associated hard vegetable fibres; and supports for the fibre, extending beside a face of the mat, transversely of the direction of air flow through the unit, comprising thin strips of substantial breath set edgewise in the said direction of air flow and pressing against the fibres at said face of the mat.

3. An air filtering unit comprising a container having face and back open for air flow, adapted to be set in a conduit of air flow; a plurality of mats therein, of loosely associated hard vegetable fibres; a separator extending between side walls across the container, transversely to the direction of air flow, spacing said mats apart in the direction of flow through the unit; and projecting points on the separator, distributively positioned over the area thereof, for engaging in surface parts of the mass of fibre, thereby to maintain the distribution of the fibre within its mat; the separator having broad thin strips, set edgewise to the direction of air flow and in whose edges are recesses into which fibres pressed edgewise against the strips can enter, the said projecting points being in pairs at the entrances of the recesses, one on each side of a recess, extending in approximate parallelism with the general direction of the edge in which the recess is.

4. An air filtering unit comprising three blocks of loosely associated hard vegetable fibres, said blocks having broad front and back surfaces, to which the air flow is normal, and being set parallel, in succession, in the unit, in the direction of air flow; edgewise strips, criss-crossed over each other, providing spaces between each two adjacent blocks, each space having length in direction of air flow exceeding the thickness of fibre blocks, in direction of air flow through the unit; said unit having exterior front and back face grids; and ties at intervals between the grids.

5. A filter for removing solids from a gas stream, comprising a chamber-casing having foraminous front and back faces and containing a solids-settling section between two solids-screening sections, the whole being combined as a unit adapted to stand vertically and removably across a gas duct; the said screening sections being sheet-form masses of fibres loosely assembled together; and the said settling section being a sheet-form succession of contiguous sub-chambers, into which this part of the main chamber is divided, constituted by thin strips having width several times as great as their thickness, set edgewise and perpendicular to the faces of the screening sections and holding the faces of the screening sections apart; some of the said partitions constituting floors at locations distributed across the height of the settling section, thereby arresting solids which settle a short distance from any level in this part of the main chamber and others of the said partitions constituting supports preventing sagging of the said floors.

6. An air filter unit, comprising fibrous filtering material organized in a plurality of masses of fibre in the shape of blocks, in each of which blocks the fibres extend across the direction of flow of air through the unit, and are loosely matted to a substantial thickness of block in the said direction of flow of air; means for maintaining the blocks spaced apart a substantial distance in the said direction of flow of air, said means comprising thin sheet elements set edgewise between blocks thereby offering but little obstruction to flow of air through the unit; said elements having means distributed over their said edges for engaging fibres of the blocks, constituting supports against movement of those fibres in directions transverse to the direction of flow of air through the unit.

7. An air filter unit, comprising fibrous filtering material organized in a plurality of masses of fibre in the shape of blocks, in each of which blocks the fibres extend across the direction of flow of air through the unit, and are loosely matted to a substantial thickness of block in the said direction of flow of air; means for maintaining the blocks spaced apart a substantial distance in the said direction of flow of air, said means comprising thin sheet elements set edgewise between blocks thereby offering but little obstruction to flow of air through the unit; said elements having impaling points distributed along their said edges for impaling fibres at the surface of a block, thereby distributively supporting the fibre against movement in directions transverse to the direction of flow of air through the unit.

8. An air filter unit, comprising fibrous filtering material organized in a plurality of masses of fibre in the shape of blocks, in each of which blocks the fibres extend across the direction of flow of air through the unit, and are loosely matted to a substantial thickness of block in the said direction of flow of air; means for maintaining the blocks spaced apart a substantial distance in the said direction of flow of air, said means comprising thin sheet elements set edgewise between blocks thereby offering but little obstruction to flow of air through the unit; said elements having an adhesive substance distributed over their edges for engaging fibres and providing distributed support for the fibre against movement in directions transverse to the direction of flow of air through the unit.

9. An air filter unit, comprising fibrous filtering material organized in a plurality of masses of fibre in the shape of blocks, in each of which blocks the fibres extend across the direction of flow of air through the unit, and are loosely matted to a substantial thickness of block in the said direction of flow of air; means for maintaining the blocks spaced apart a substantial distance in the said direction of flow of air, said means comprising thin sheet elements crossing each other between the blocks and set edgewise thereby offering but little obstruction to flow of air through the unit.

10. An air filter unit, comprising fibres organized in a plurality of masses in the shape of blocks, in each of which blocks the fibres extend approximately parallel to the face of the block, thus lying across the direction of flow of air through the unit, and are loosely matted in a substantial thickness of block in the said direction of air flow; combined with a plurality of thin strip elements, each being parallel-sided and having its edges extending in directions which are parallel to each other and to the faces of said blocks of fibre, each strip being set edgewise toward the face of the block, with its width extending in direction perpendicular to the faces of said blocks of fibre, and each strip having width several times as great as its thickness, for spacing the blocks apart a distance approximating the width of said strip elements in the direction of flow of air; some of said strip elements having their broad faces upward and constituting floors for settling chambers between said blocks; the said fibres being long hard vegetable fibres, and the strip elements being distributed at intervals across an area parallel to the face of the block.

RALPH L. DREW.
STEPHEN A. REED.